United States Patent [19]

Williams

[11] Patent Number: 5,754,451
[45] Date of Patent: May 19, 1998

[54] PREVENTATIVE MAINTENANCE AND DIAGONSTIC SYSTEM

[75] Inventor: Chet R. Williams, Arlington, Tex.

[73] Assignee: Raytheon Company, Lexington, Mass.

[21] Appl. No.: 608,866

[22] Filed: Feb. 29, 1996

[51] Int. Cl.$^6$ .................................................. G06F 17/00
[52] U.S. Cl. .................... 364/551.01; 364/184; 364/188; 364/468.15
[58] Field of Search .................................... 364/141, 146, 364/184, 185, 188, 468.15, 468.16, 468.17, 468.18, 479.19, 479.22, 550, 580, 551.01; 395/183.01, 183.13, 184.01

[56] References Cited

U.S. PATENT DOCUMENTS

| | | | |
|---|---|---|---|
| 3,882,305 | 5/1975 | Johnstone | 364/551.02 |
| 4,682,158 | 7/1987 | Ito et al. | 364/185 X |
| 4,985,857 | 1/1991 | Bajpai et al. | 364/551.01 X |
| 5,309,351 | 5/1994 | McCain et al. | 364/550 X |
| 5,414,632 | 5/1995 | Mochizuki et al. | 364/474.16 |
| 5,420,571 | 5/1995 | Coleman et al. | 364/550 X |
| 5,446,672 | 8/1995 | Boldys | 364/474.16 |

Primary Examiner—Michael Zanelli
Assistant Examiner—Edward J. Pipala
Attorney, Agent, or Firm—W. C. Schubert; G. H. Lenzen, Jr.

[57] ABSTRACT

A maintenance system for a machine (12) controlled by a programmable logic controller (14) having a memory (20) which stores input data received from the machine (12) and output data communicated to the machine (12). The maintenance system includes a computer (33) interfaced to the memory to be non-intrusive with respect to the programmable logic controller (14). The computer (33) is operative to monitor a state of the machine (12) over a plurality of manufacturing cycles, the state including at least a portion of the input data and the output data. The computer (33) is further operative to detect a fault condition for a component of the machine (12) based upon a state of a current manufacturing cycle and a state of a previous manufacturing cycle. A display device (32) is in communication with the computer (33) to alert an operator of the fault condition and to graphically display a location of the component within the machine (12) to facilitate a corrective measure by the operator.

24 Claims, 3 Drawing Sheets

PREVENTATIVE MAINTENANCE AND DIAGONSTIC SYSTEM

TECHNICAL FIELD

The present invention relates to systems for preventing and diagnosing equipment faults in manufacturing systems.

BACKGROUND ART

In order to remain competitive, many industries, such as the automotive industry, have increasingly automated their assembly processes through the use of computer-controlled equipment. As these processes have become more automated, the diagnosis of faults and maintenance of the equipment have become more complex.

If a fault occurs during the manufacturing process, an operator is responsible for diagnosing and resolving the fault. Since no products can be produced during manufacturing equipment down time, it is important that the operator diagnose and resolve the fault expeditiously.

In order to avoid fault conditions, many manufacturing processes utilize some form of preventative maintenance. Typically, preventative maintenance is initiated by check lists of schedules based upon manufacturer estimates for the lifetime of various components. Using this approach, it is incumbent that the operator be well versed in both equipment part location and maintenance procedures.

SUMMARY OF THE INVENTION

It is an object of the present invention to provide methods and systems for preventative maintenance having schedules which are not based solely on manufacturer estimates, but rather are based on real-life manufacturing environment scenarios.

A further object of the present invention is to provide methods and systems for preventative maintenance which facilitate ease in performing maintenance by an operator.

A still further object is to provide methods and system for preventative maintenance which do not require the operator to be literate to perform the corrective measure.

In carrying out the above objects, the present invention provides a maintenance system for a machine controlled by a programmable logic controller having a memory which stores input data received from the machine and output data communicated to the machine. The maintenance system includes a computer interfaced to the memory to be non-intrusive with respect to the programmable logic controller. The computer is operative to monitor a state of the machine over a plurality of manufacturing cycles, the state including at least a portion of the input data and the output data. The computer is further operative to detect a fault condition for a component of the machine based upon a state of a current manufacturing cycle and a state of a previous manufacturing cycle. A display device is in communication with the computer to alert an operator of the fault condition and to graphically display a location of the component within the machine to facilitate a corrective measure by the operator.

In a preferred embodiment of the maintenance system, the display device displays an image of the machine including an image of the component therein, wherein the image of the component is highlighted in a predetermined manner to indicate the fault condition. Upon receiving an operator-initiated action to select the image of the component, the display device displays information on correcting the fault condition. Further, a magnified image of the component can be displayed to graphically illustrate the corrective measure.

The computer can further maintain a respective cycle count for each of at least one component of the machine, each cycle count indicative of a number of manufacturing cycles performed by a corresponding component. Here, the display device alerts the operator when a cycle count has reached a predetermined limit and graphically displays a location of the component corresponding to the cycle count within the machine to facilitate a corrective measure by the operator. The predetermined limit can be indicative of a mean time between failures for the component, for example.

The computer can still further maintain a respective preventative maintenance schedule for each of at least one component of the machine. Here, the display device alerts the operator when a component is due for preventative maintenance and graphically displays a location of the component within the machine to facilitate a preventative maintenance measure by the operator.

The computer can also form a transition history for a moving component over each of a plurality of manufacturing cycles. Here, the display device alerts the operator when a transition history of a current manufacturing cycle differs from a transition history of a previous manufacturing cycle beyond a predetermined level, and graphically displays a location of the moving component within the machine.

The computer can also maintain a library of states of the machine for fault conditions. Upon detecting a fault condition, the display device displays potential failure points using the library.

These and other features, aspects, and embodiments of the present invention will become better understood with regard to the following description, appended claims, and accompanying drawings.

BEST MODE FOR CARRYING OUT THE INVENTION

Figure 1:
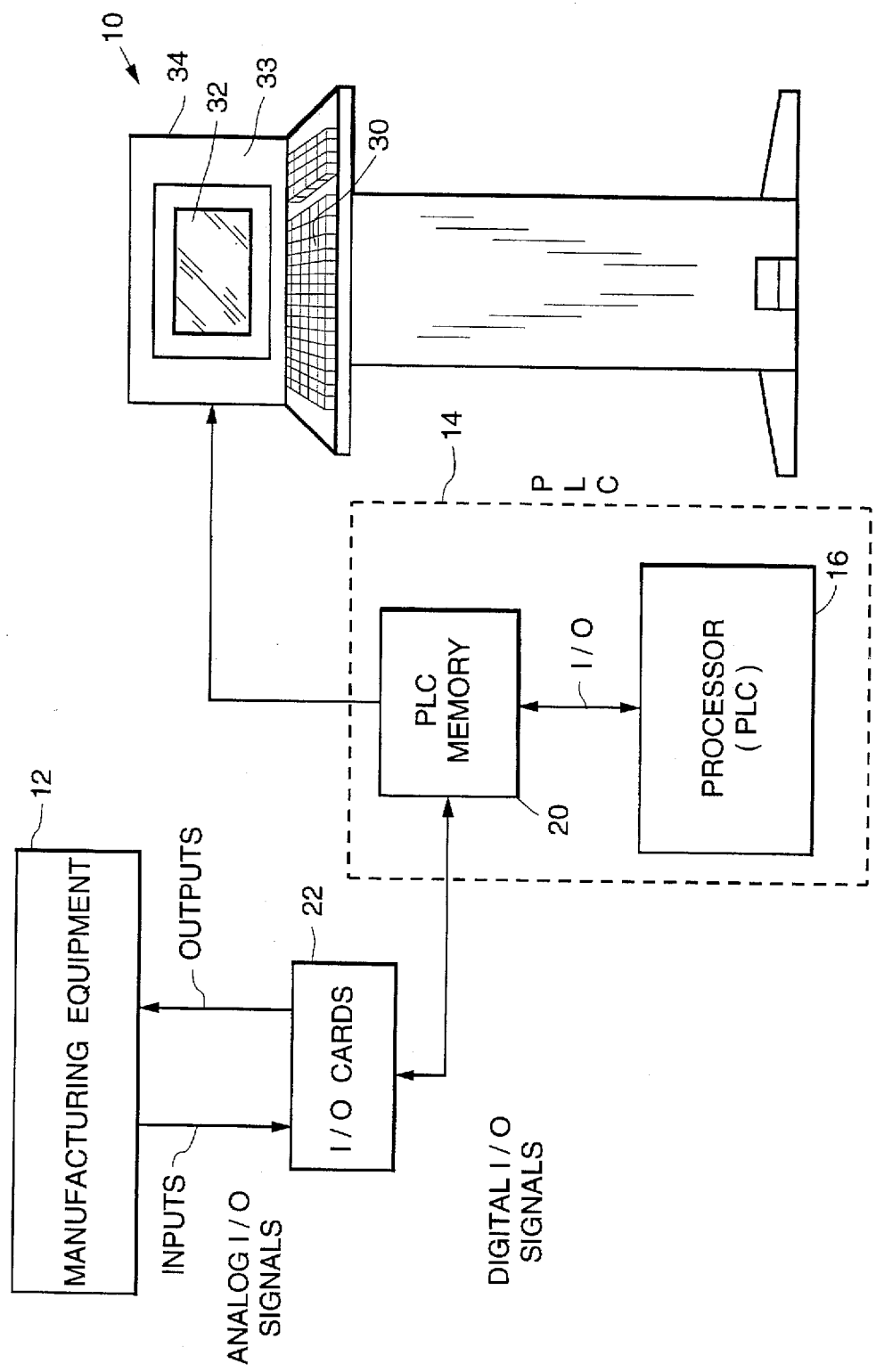
FIG. 1 is a schematic block diagram of an embodiment of a preventative maintenance device in accordance with the present invention.

FIG. 1 is a schematic block diagram of an embodiment of a preventative maintenance device in accordance with the present invention. The preventative maintenance device 10 provides preventative maintenance and diagnostic information for a machine, such as manufacturing equipment 12, controlled by a programmable logic controller 14. The programmable logic controller 14 includes a processor 16 and an input/output memory 20. The processor 16 executes a sequence of programmed steps to control each manufacturing cycle of the manufacturing equipment 12.

The input/output memory 20 contains a memory location for each of a plurality of inputs received from the manufacturing equipment 12, and a corresponding memory location for each of a plurality of outputs to the manufacturing equipment 12. For example, the plurality of inputs can include various switches and sensors within the manufacturing equipment 12, and the plurality of outputs can includes lights, solenoids, and/or motors in the manufacturing equipment 12.

Data for the inputs and the outputs can be communicated between the input/output memory 20 and the manufacturing equipment 12 by input/output cards 22. The input/output cards 22 convert between digital input/output signals for the input/output memory 20 and analog input/output signals for the manufacturing equipment 12.

The preventative maintenance device 10 interfaces to the input/output memory 20 of the programmable logic controller 14. The preventative maintenance device 10 dynamically monitors the input/output memory 20 as the programmable logic controller 14 controls the manufacturing equipment 12. Through monitoring the input/output memory 20, the preventative maintenance device 10 is able to both track preventative maintenance data and act as a diagnostic tool. The preventative maintenance device 10 is also capable of learning from equipment breakdowns.

As illustrated in FIG. 1, the preventative maintenance device is preferably a stand-alone device which interfaces to the programmable logic controller 14. The preventative maintenance device 10 includes a user interface such as a keyboard 30, and a display device 32 such as a cathode ray tube, which are both accessible to an operator. The keyboard 30 and the display device 32 communicate with a computer 33, such as a standard personal computer, housed within a sealed cabinet 34. The keyboard 30, the cathode ray tube 32, and the computer are sealed to protect against a plant floor environment. Here, the sealed cabinet 34 can include an industrial quality sealed cabinet; the keyboard 30 can include a sealed membrane keyboard; and the display device 32 can include an industrial quality touchscreen cathode ray tube.

The computer 33 in the preventative maintenance device 10 is configured with at least one mass storage device, such as a hard disk drive and/or a CD-ROM drive. The at least one mass storage device is used to store data such as machine drawings, machine video images, preventative maintenance schedules, machine history, and diagnostic information. For a large amount of data to be stored, the at least one mass storage device can include a multi-disk CD-ROM tower.

The computer 33 in the preventative maintenance device 10 can include a standard interface card for communicating with the input/output memory 20 of the programmable logic controller 14. The computer monitors changes in the input/output memory 20 in a real time fashion. By monitoring data in the input/output memory 20, the computer 33 can detect memory patterns or states to recognize events as they occur on the manufacturing equipment 12. The memory patterns can be used to provide preventative maintenance requests to the operator on a timely basis, to help diagnose a problem, and to select reference material to perform any maintenance.

In particular, the preventative maintenance device 10 stores technical data for individual parts of the manufacturing equipment 12. The data includes both wear data and preventative maintenance schedules. Also stored on the preventative maintenance device 10 is an image data base of the manufacturing equipment 12.

When the preventative maintenance device 10 determines that a part is due for preventative maintenance or the part is experiencing a fault, a warning message is displayed on the display device 32 along with pictorial views. If the operator is unsure of the part location or how to service the part, a series of images are displayed on the display device 32 to direct the operator. The series of images are utilized to lead the operator through either a preventative maintenance procedure or a fault solution procedure. This approach to on-line monitoring and servicing allows the operator to learn about the machine, maintain a presence at the machine, and perform all assigned duties in a reliable fashion.

The preventative maintenance device 10 is designed to be non-intrusive with respect to the programmable logic controller 14 and the manufacturing equipment 12. More specifically, the preventative maintenance device 10 is prohibited from modifying the input/output memory 20. Any input/output manipulation which is required is done locally in memory within the preventative maintenance device 10. Further, a hardware disconnect can be utilized to mechanically disconnect the preventative maintenance device 10 from the programmable logic controller 14.

Figure 2:
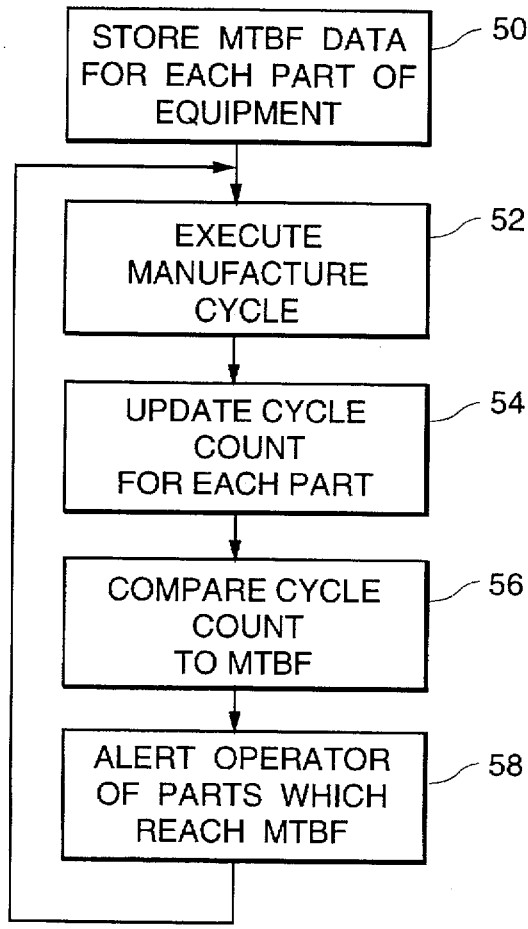
FIG. 2 is a flow chart of a method of preventative maintenance which is performed by the preventative maintenance device.

FIG. 2 is a flow chart of a method of preventative maintenance which is performed by the preventative maintenance device 10. As indicated by block 50, the preventative maintenance device 10 stores predetermined cycle count limits, such as mean time between failures (MTBF) data, for the various parts of the manufacturing equipment 12. The cycle count limits can be provided by the manufacturer or can be obtained through experience.

As indicated by block 52, the programmable logic controller 14 commands a manufacturing cycle for the manufacturing equipment 12. To account for the manufacturing cycle performed in the above-described step, the preventative maintenance device 10 updates a total cycle count for each of the parts of the manufacturing equipment 12 (as indicated by block 54). The preventative maintenance device 10 then compares each total cycle count to a corresponding cycle count limit stored therein, as indicated by block 56. As the actual cycle count and the stored cycle count limit converge for a part, the preventative maintenance device 10 alerts the operator as indicated by block 58.

The preventative maintenance device 10 can also monitor and display wear information for various parts in the manufacturing equipment 12. The wear presentation, which is preferably graphical in nature, provides current wear and a comparison to a corresponding MTBF quantity. This allows the operator to determine potential failure parts. Optionally, the preventative maintenance device 10 can provide automatic warnings based upon an analysis of incoming part failure rates.

Figure 3:
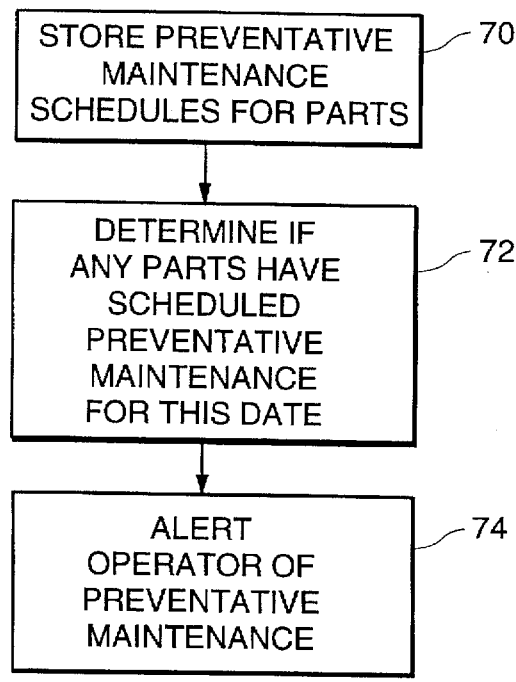
FIG. 3 is a flow chart of another preventative maintenance method performed by the preventative maintenance device.

FIG. 3 is a flow diagram of another preventative maintenance method performed by the preventative maintenance device 10. As indicated by block 70, preventative maintenance schedules for the various components of the manufacturing equipment 12 are stored in the preventative maintenance device 10. The preventative maintenance schedules can be daily, weekly, monthly, or yearly checks on the condition of the manufacturing equipment 12.

Based on the current date, a step of determining if any specific component has reached its scheduled preventative maintenance date is performed as indicated by block 72. If a preventative maintenance is scheduled for the current date, the preventative maintenance device 10 alerts the operator as indicated by block 74. The operator can be alerted via the display device 32 to perform the required check. To aid the operator in part location and required maintenance duties, both pictorial data and text can be displayed on the display device 32, as indicated by block 76.

The preventative maintenance schedule can be dynamically maintained based upon real-time input from the manufacturing equipment. The real-time input for the schedules can be based upon fault, repair, and part transition histories which are described hereinafter.

Some parts of the manufacturing equipment 12 transition from one position to another position within each manufacturing cycle. Many of these moving parts have sensors which tell the programmable logic controller 14 the location of the part within the transition. The preventative maintenance device 10 can be utilized to monitor these parts using the method of FIG. 4.

As indicated by block 80, a step of monitoring the part location via the input/output memory 20 is performed over a manufacturing cycle. Based on data monitored in the above-described step, a transition history is formed for the part, as indicated by block 82. The steps indicated by blocks 80 and 82 can be performed to form individual part transition histories for each moving part as the manufacturing equipment 12 runs.

As indicated by block 84, the transition history for each part is compared to a previous transition history for each part. If a part deviates from its previous transition history, then the preventative maintenance device 10 can flag the part as a potential problem area and alert the operator as indicated by block 86. Here, a suitable message can be displayed on the display device 32 for the operator.

Figures 4, 5:
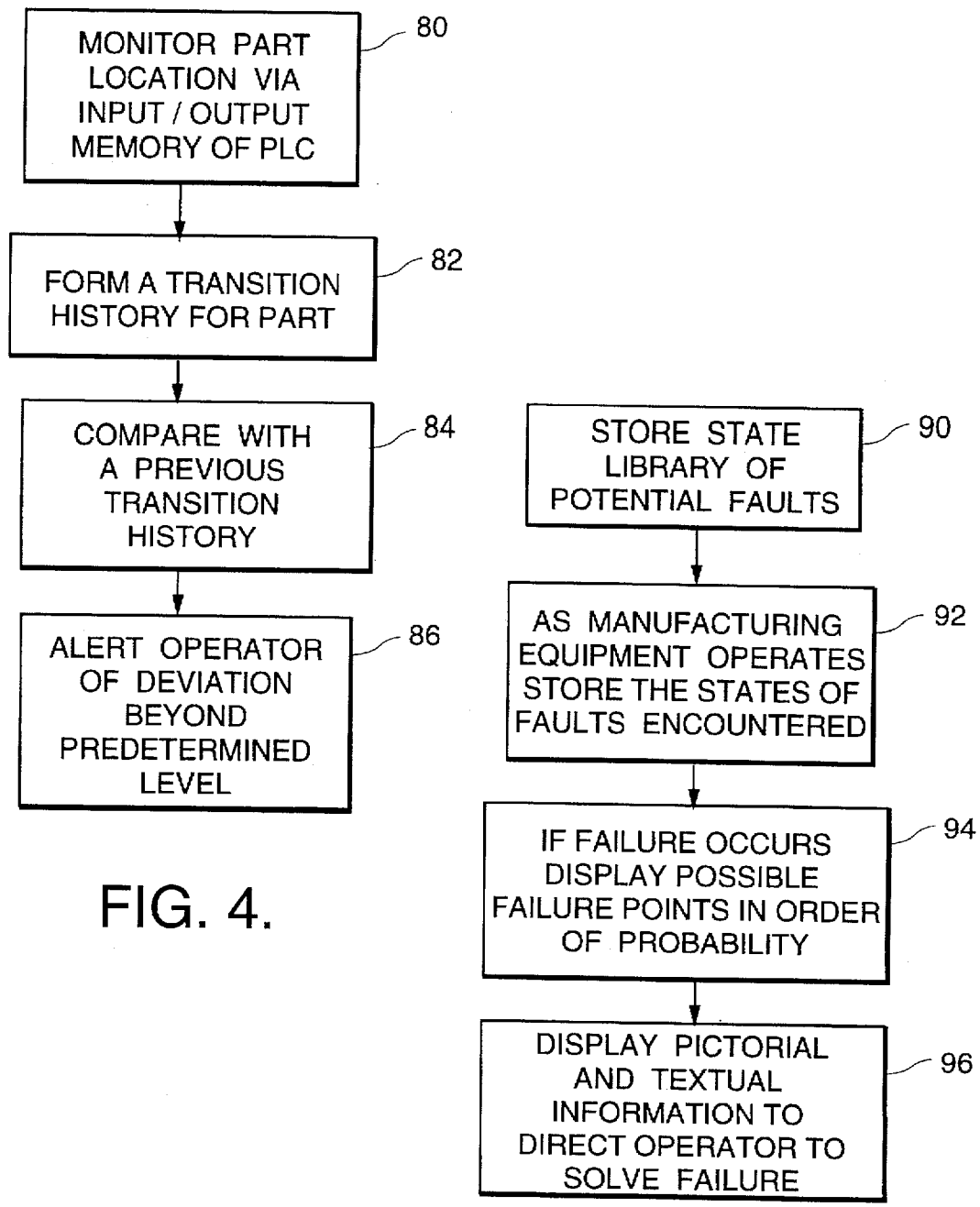
FIG. 4 is a method of monitoring moving parts using the preventative maintenance device.
FIG. 5 is a flow chart of a method of performing fault diagnosis using the preventative maintenance device.

FIG. 5 is a flow chart of an embodiment of a method of performing a fault diagnosis using the preventative maintenance device 10. As indicated by block 90, a step of storing, within the preventative maintenance device 10, a library of input/output states for potential faults is performed. As the manufacturing equipment 12 operates, the preventative maintenance device 10 stores, to its library, the states of faults encountered as indicated by block 92.

The preventative maintenance device 10 can aid the operator in the solution of a fault based upon the original and learned states stored therewithin. In particular, if a failure occurs, a step of displaying possible failure points in order of probability is performed as indicated by block 94. Further, a step of displaying pictorial and textual information to direct the operator to solve the failure can be performed as indicated by block 96.

For the purpose of this application, the term "state data" is inclusive of a simple snapshot of the input/output memory 20 at any point in time. The state data includes outputs issued by the programmable logic controller 14 to the manufacturing equipment 12, and inputs returned to the programmable logic controller 14 from the manufacturing equipment 12.

The initial library of input/output states for potential faults can be determined in an off-line study of the manufacturing equipment and software which runs the programmable logic controller 14. This off-line study can include both a study of the hardware in the manufacturing equipment and a study of any past failure areas. Future additions to the library come from the preventative maintenance device 10 learning from a failure. In addition to storing the state data for a failure, the preventative maintenance device 10 can allow the operator or other qualified person to enter notes on the fault and its solution. The notes on the fault can be used to modify preventative maintenance schedules or pin point high risk failure points.

The above-described embodiments of the present invention have many advantages. By graphically displaying a location of a component to which a corrective measure is to be performed, and graphically illustrating the corrective measure, embodiments of the present invention are advantageous in facilitating ease in performing maintenance by an operator. Further, it is not necessary for the operator to be literate to perform the corrective measure.

Embodiments of the present invention are further advantageous in that preventative maintenance schedules can be dynamically maintained based upon real-time input from the manufacturing equipment. The real-time input for the schedules are based upon fault, repair, and part transition histories. Hence, the schedules need not be based solely on manufacturer estimates, but rather are based on real-life manufacturing environment scenarios.

It should be noted that the present invention may be used in a wide variety of different constructions encompassing many alternatives, modifications and variations which are apparent to those with ordinary skill in the art. Accordingly, the present invention is intended to embrace all such alternatives, modifications, and variations as fall within the spirit and broad scope of the appended claims.

What is claimed is:

1. A maintenance system for a machine controlled by a programmable logic controller, the programmable logic controller including a memory which stores input data received from the machine and output data communicated to the machine, the maintenance system comprising:

a computer interfaced to the memory and prohibited from modifying the memory, the computer operative to monitor a state of the machine over a plurality of manufacturing cycles, the state including at least a portion of the input data and the output data, the computer further operative to detect a fault condition for a component of the machine based upon a comparison of a current state for the manufacturing cycle and a previous state for the manufacturing cycle; and a display device in communication with the computer to alert an operator of the fault condition and to graphically display a location of the component within the machine to facilitate a corrective measure by the operator.

2. The maintenance system of claim 1 wherein the display device displays an image of the machine including an image of the component therein, wherein the image of the component is highlighted in a predetermined manner to indicate the fault condition.

3. The maintenance system of claim 2 wherein upon an operator-initiated action to select the image of the component, the display device displays information on correcting the fault condition.

4. The maintenance system of claim 3 wherein upon the operator-initiated action, a magnified image of the component is displayed to graphically illustrate the corrective measure.

5. The maintenance system of claim 1 wherein the computer is operative to maintain a respective cycle count for each of at least one component of the machine, each cycle count indicative of a number of manufacturing cycles performed by a corresponding component, and wherein the display device alerts the operator when a cycle count has reached a predetermined limit and graphically displays a location of the component corresponding to the cycle count within the machine to facilitate a corrective measure by the operator.

6. The maintenance system of claim 5 wherein the predetermined limit is indicative of a mean time between failures for the component.

7. The maintenance system of claim 5 wherein the display device displays an image of the machine including an image of the component whose cycle count reached the predetermined limit, wherein the image of the component is highlighted in a predetermined manner.

8. The maintenance system of claim 1 wherein the computer is operative to maintain a respective preventative maintenance schedule for each of at least one component of the machine, and wherein the display device alerts the operator when a component is due for preventative maintenance, the display device graphically displaying a location of the component within the machine to facilitate a preventative maintenance measure by the operator.

9. The maintenance system of claim 8 wherein the display device displays an image of the machine including an image of the component due for preventative maintenance, wherein the image of the component is highlighted in a predetermined manner.

10. The maintenance system of claim 1 wherein the computer forms a transition history for a moving component over each of a plurality of manufacturing cycles, and wherein the display device alerts the operator when a transition history of a current manufacturing cycle differs from a transition history of a previous manufacturing cycle beyond a predetermined level, the display device graphically displaying a location of the moving component within the machine.

11. The maintenance system of claim 10 wherein the display device displays an image of the machine including an image of the moving component, wherein the image of the moving component is highlighted in a predetermined manner.

12. The maintenance system of claim 1 wherein the computer maintains a library of states of the machine for fault conditions, and wherein the display device displays potential failure points based upon the library upon detecting a fault condition.

13. A computer-implemented method of maintaining a machine controlled by a programmable logic controller, the programmable logic controller including a memory which stores input data received from the machine and output data communicated to the machine, the method comprising the steps of:

monitoring the memory while prohibiting modification thereof to monitor a state of the machine over a plurality of manufacturing cycles, the state including at least a portion of the input data and the output data from the memory;

comaring a current state for the manufacturing cycle to a previous state for the manufacturing cycle;

detecting a fault condition for a component of the machine based upon a difference between the current state and the previous state of the manufacturing cycle;

alerting an operator of the fault condition; and graphically displaying a location of the component within the machine to facilitate a corrective measure by the operator.

14. The computer-implemented method of claim 13 wherein the step of graphically displaying includes displaying an image of the machine and an image of the component therein, wherein the image of the component is highlighted in a predetermined manner to indicate the fault condition.

15. The computer-implemented method of claim 14 further comprising the steps of:

receiving an operator-initiated action to select the image of the component; and displaying information on correcting the fault condition upon receiving the operator-initiated action.

16. The computer-implemented method of claim 15 further comprising the step of displaying a magnified image of the component to graphically illustrate the corrective measure upon receiving the operator-initiated action.

17. The computer-implemented method of claim 13 further comprising the steps of:

maintaining a respective cycle count for each of at least one component of the machine, each cycle count indicative of a number of manufacturing cycles performed by a corresponding component;

alerting the operator when a cycle count has reached a predetermined limit; and graphically displaying a location of the component corresponding to the cycle count within the machine to facilitate a corrective measure by the operator.

18. The computer-implemented method of claim 17 wherein the predetermined limit is indicative of a mean time between failures for the component.

19. The computer-implemented method of claim 17 wherein the step of displaying the location of the component corresponding to the cycle count includes displaying an image of the machine with an image of the component whose cycle count reached the predetermined limit, wherein the image of the component is highlighted in a predetermined manner.

20. The computer-implemented method of claim 13 further comprising the steps of:

maintaining a respective preventative maintenance schedule for each of at least one component of the machine;

alerting the operator when a component is due for preventative maintenance; and graphically displaying a location of the component due for preventative maintenance within the machine to facilitate a preventative maintenance measure by the operator.

21. The computer-implemented method of claim 20 wherein the step of graphically displaying the location of the component due for preventative maintenance includes displaying an image of the machine including an image of the component due for preventative maintenance, wherein the image of the component is highlighted in a predetermined manner.

22. The computer-implemented method of claim 13 further comprising the steps of:

forming a transition history for a moving component over each of a plurality of manufacturing cycles;

alerting the operator when a transition history of a current manufacturing cycle differs from a transition history of a previous manufacturing cycle beyond a predetermined level; and graphically displaying a location of the moving component within the machine.

23. The computer-implemented method of claim 22 wherein the step of graphically displaying the location of the moving component includes displaying an image of the machine and an image of the moving component therein, wherein the image of the moving component is highlighted in a predetermined manner.

24. The computer-implemented method of claim 13 further comprising the steps of:

maintaining a library of states of the machine for fault conditions; and displaying potential failure points based upon the library upon detecting a fault condition.

* * * * *